United States Patent
Nemser et al.

(10) Patent No.: US 7,838,267 B1
(45) Date of Patent: Nov. 23, 2010

(54) INCREASING RATE OF ENZYME CATALYZED EQUILIBRIUM REACTIONS

(75) Inventors: Stuart Nemser, Wilmington, DE (US); Mary E. Rezac, Manhattan, KS (US)

(73) Assignees: CMS Technologies Holdings, Inc., Newport, DE (US); Kansas State University Research Foundation, Manhattan, KS (US)

( * ) Notice: Subject to any disclaimer, the term of this patent is extended or adjusted under 35 U.S.C. 154(b) by 601 days.

(21) Appl. No.: 11/925,070

(22) Filed: Oct. 26, 2007

Related U.S. Application Data

(60) Provisional application No. 60/854,924, filed on Oct. 27, 2006.

(51) Int. Cl.
*C12P 19/00* (2006.01)
*C12P 1/00* (2006.01)
*C12P 7/62* (2006.01)
*C12P 13/00* (2006.01)

(52) U.S. Cl. .................. 435/72; 435/128; 435/132; 435/135; 435/161; 435/162; 435/163

(58) Field of Classification Search ............... None
See application file for complete search history.

(56) References Cited

U.S. PATENT DOCUMENTS

| | | |
|---|---|---|
| 3,308,107 A | 3/1967 | Selman et al. |
| 3,488,335 A | 1/1970 | Braun |
| 3,865,845 A | 2/1975 | Resnick |
| 4,399,264 A | 8/1983 | Squire |
| 4,431,786 A | 2/1984 | Squire |
| 4,565,855 A | 1/1986 | Anderson et al. |
| 4,594,399 A | 6/1986 | Anderson et al. |
| 4,754,009 A | 6/1988 | Squire |
| 4,897,457 A | 1/1990 | Nakamura et al. |
| 4,910,276 A | 3/1990 | Nakamura et al. |
| 5,021,602 A | 6/1991 | Clement et al. |
| 5,117,272 A | 5/1992 | Nomura et al. |
| 5,146,009 A | 9/1992 | Cohen et al. |
| 5,248,427 A | 9/1993 | Spiske et al. |
| 5,268,411 A | 12/1993 | Yoktsuka et al. |
| 5,498,682 A | 3/1996 | Navarrini et al. |
| 5,510,406 A | 4/1996 | Matsuo et al. |
| 5,710,345 A | 1/1998 | Navarrini et al. |
| 5,883,177 A | 3/1999 | Colaianna et al. |
| 5,962,612 A | 10/1999 | Takakura et al. |
| 6,040,419 A | 3/2000 | Drysdale et al. |
| 6,899,743 B2 | 5/2005 | Wijmans et al. |
| 7,732,173 B2 * | 6/2010 | Mairal et al. ............ 435/161 |
| 2007/0031954 A1 | 2/2007 | Mairal et al. |

OTHER PUBLICATIONS

Amorphous Teflons AF as organophilic pervaporation materials Transport of individual components, A.M. Polyakov, L.E. Starannikova, Yu. P. Yampolskii, Journal of Membrane Science 216 (2003) 241-256.

Pervaporation Comes of Age, N. Wynn, www.cepmagazine.org, Chemical Engineering Progress Oct. 2001, p. 66-72.

Lipase-Catalyzed Synthesis of Geranyl Acetate in n-Hexane with Membrane-Mediated Water Removal, K. Bartling, J. U. S. Thompson, P.H. Pfromm, P. Czermak, M.E. Rezac, Biotechnology and Bioengineering (75) No. 6 John Wiley & Sons, Inc., pp. 676-681, Dec. 20, 2001.

Enzymatic esterification reaction in organic media with continuous water stripping: effect of water content on reactor performance and enzyme agglomeration, J.C.Jeong, S.B. Lee Biotechnology Techniques (11) No. 12, 1997, Chapman & Hall, pp. 853-858.

Properties of Amorphous Fluoropolymers Based on 2,2-Bistrifluoromethyl-4,5-Difluoro-1,3-Dioxole, W. H. Buck, P. R. Resnick, 183rd Meeting of Electrochemical Society, Honolulu, HI, May 17, 1993, pp. 1-12.

* cited by examiner

*Primary Examiner*—Herbert J. Lilling
(74) *Attorney, Agent, or Firm*—Jeffrey C. Lew

(57) ABSTRACT

A method of increasing the rate of conversion of reactants to reaction product of enzyme catalyzed, reversible, i.e., equilibrium, reactions having water or methanol as byproduct includes removing water and/or methanol from the reaction mass during reaction by permeation of the reaction mass through a selectively permeable perfluorinated polymer or copolymer membrane.

2 Claims, 3 Drawing Sheets

INCREASING RATE OF ENZYME CATALYZED EQUILIBRIUM REACTIONS

This application claims benefit of U.S. provisional application Ser. No. 60/854,924 filed Oct. 27, 2006.

FIELD OF THE INVENTION

The invention relates to a method of increasing the rate of equilibrium reactions by removing a byproduct from the reaction mass. More specifically, it relates to increasing the rate of enzyme catalyzed equilibrium reactions by preferentially permeating through a selective perfluoropolymer membrane water or methanol byproduct of the reaction and thereby removing the byproduct from the mass.

BACKGROUND OF THE INVENTION

The ability to control the speed of chemical reactions and in particular to increase the rate of chemical reactions is a matter of intense industrial interest. Rate of reaction is typically a function of temperature in which the higher the temperature the faster the reaction rate. In certain systems raising reaction temperature can have adverse effects. Other methods of changing the rate of reaction are desirable.

In equilibrium reaction systems two reactions are active simultaneously. A forward reaction produces a desired product and usually a less desired byproduct from original reactants. In addition the product and byproduct compounds can react together in a reverse reaction to re-form the original reactants. In such systems it is usually desired to increase the rate of production of the desired product. Increasing the temperature can increase the rate of the reverse reaction as well as the forward reaction. Consequently raising temperature does not necessarily convert the original reactants to the desired product faster.

Removing byproduct from the reaction mass of an equilibrium reaction can drive the reaction to high conversion by robbing the reaction mass of the product and byproduct materials that are the reactants for the reverse reaction. For equilibrium reactions in which water or methanol is a byproduct, removing water or methanol from the reaction mass during reaction can drive the reaction to more completely consume the original reactants to great productive benefit. Esterification, acetalization and ketalization condensations are examples of reactions that are normally limited in ability to provide purer product at higher yield and with greater speed due to equilibrium considerations. Water byproduct present in the reaction mass shifts the equilibrium unfavorably. However, if water could be removed, the equilibrium would shift further toward the product side of the reaction equations. There is a need to remove water from these reaction compositions at high rate to promote productivity of equilibrium reactions.

Traditional methods of removing water or methanol from other components include fractional distillation, thermal evaporation, cryogenic dehydration, and chemical adsorption to name a few. Such methods have drawbacks such as requiring generally complex equipment and systems (e.g., distillation columns with associated pumps, heat exchangers and the like). They typically involve recirculating fluid and solvents in large volume relative to the product volume which adds to material cost as well as contributes to potential waste, safety and environmental protection concerns. Also these processes call for substantial energy input for heating and cooling of circulating fluids that further adds to the cost of operation. Chemical adsorption processes frequently operate cyclically and therefore additionally often utilize oversized and redundant adsorber units so that saturated units can be taken offline for regeneration without interrupting production.

Membrane separation processes for segregating components of mixtures by selectively permeating individual components through a membrane are well known. An excellent recent survey of membrane pervaporation and vapor permeation processes is presented in "Pervaporation Comes of Age" N. Wynn, Chemical Engineering Progress, pp. 66-72, October, 2001. Very basically, in such processes one side of a selectively permeable membrane is contacted with the fluid mixture of components to be separated. A driving force, such as a pressure gradient across the membrane in the case of vapor permeation and concentration gradient in the case of pervaporation, causes preferentially permeating components to migrate through the membrane such that a permeate composition enriched in the faster permeating components develops on the other side of the membrane. A retentate composition on the feed mixture side of the membrane becomes depleted in the faster permeating components. With a vapor feed mixture fluid, this process is generally known as vapor permeation. When the feed fluid is in the liquid state, low pressure, usually vacuum, vaporizes the migrating components on the permeate side. This technique is known as pervaporation.

While offering a valuable alternative to other water and methanol removal methods, existing membrane separation technology also has limitations. Productivity is constrained by the separation characteristics of the membrane. It is a long standing problem in this field that permselective membranes usually have either high transmembrane flux or high selectivity but rarely both. The term "selectivity" means the ratio of permeability through a membrane of a faster permeating species divided by the permability through the membrane of a slower permeating species. Thus the artisan must often choose a membrane material that sacrifices permeate flow rate to achieve an acceptable selectivity.

Chemical reaction productivity is another field in which removal via membrane of water or methanol has yet to be applied to fuller potential as described in the article by Wynn mentioned above. The article points to esterification, acetalization and ketalization condensations as examples of reactions that are normally limited in ability to provide purer product at higher yield and with greater speed due to equilibrium considerations. Conventionally hydrophilic composition membranes have been found to provide improved conversion in equilibrium reaction systems. Further improvements in equilibrium reaction effectiveness is desirable.

SUMMARY OF THE INVENTION

It has been discovered that in the systems of enzyme catalyzed equilibrium reactions in which water or methanol is a byproduct, extraordinarily beneficial reaction productivity can be obtained by removing the byproduct from the reaction mass using selectively permeable perfluoropolymer membranes. That is, the net rate of producing the desirable product compound is dramatically increased relative to the net rate achieved without removing the byproduct. The initial net rate of producing the desirable product, i.e., the rate at which the desired product is formed at up to about 50% conversion, is especially enhanced.

Accordingly this invention provides, a method of conducting a chemical reaction to make a reaction product and a byproduct comprising the steps of (A) providing reactants for a reversible, enzyme catalyzed, chemical reaction in which the byproduct is selected from the group consisting of water, methanol and a mixture thereof, (B) providing an enzyme catalyst for the chemical reaction, (C) reacting the reactants in the presence of the enzyme catalyst to form a reaction mass comprising the reaction product, the byproduct and residual reactants, (D) contacting a membrane comprising a selectively permeable layer comprising a perfluoropolymer with the reaction mass, (E) applying a driving force across the membrane effective to selectively permeate the byproduct and to retain a reaction mass depleted of the byproduct relative to the reaction mass of step (C), (F) continuing the chemical reaction of the reaction mass depleted of the byproduct, (G) collecting reaction mass, and (H) optionally, adding reactants to the reaction mass of step (G) and repeating steps (C)-(G).

DETAILED DESCRIPTION OF THE INVENTION

Figure 1:
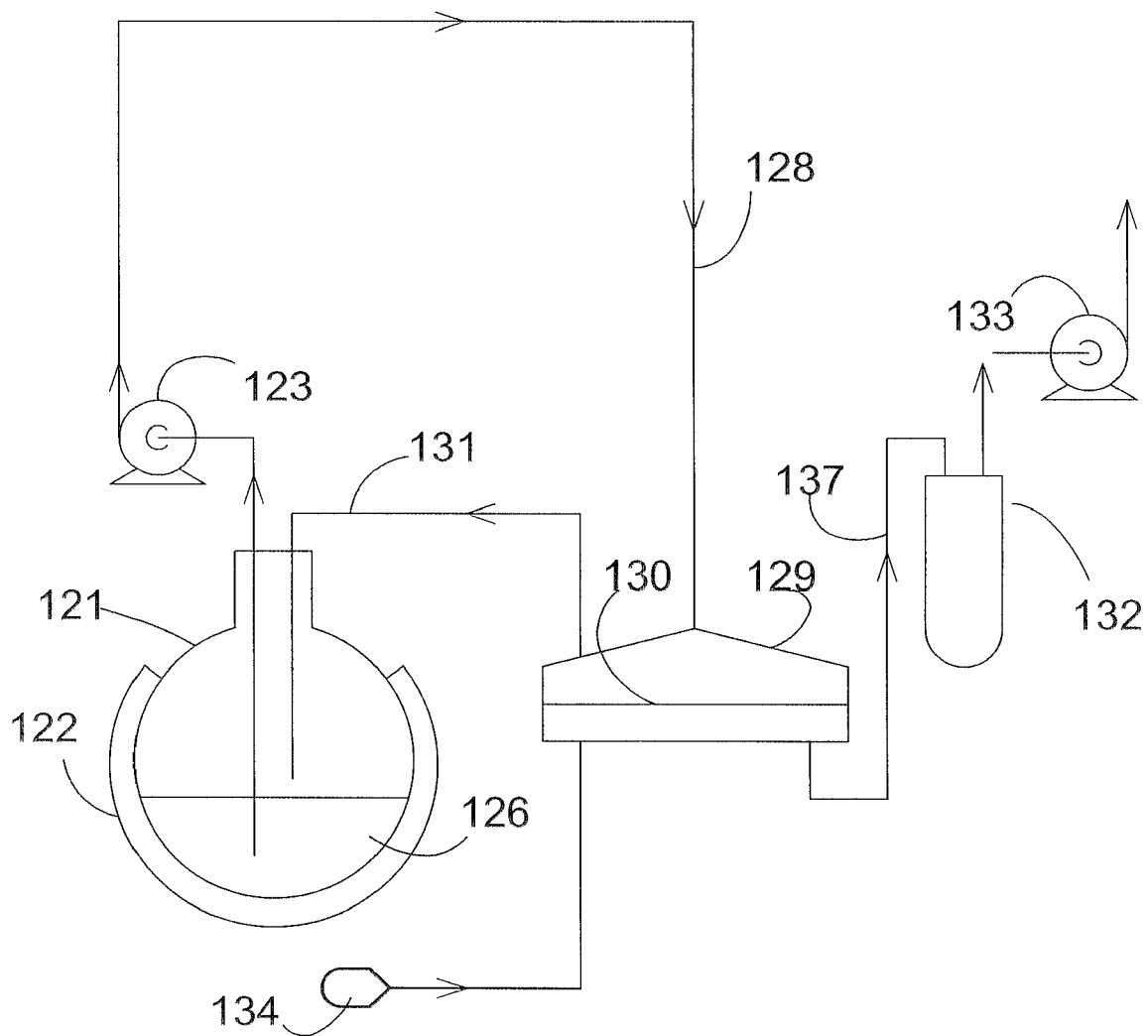
FIG. 1 is a schematic flow diagram of an apparatus used for conducting examples disclosed herein below.

Removal of water or methanol from a mixture of water or methanol and other components is occasionally referred to herein by the term "dehydration". This invention is based largely on the discovery that membranes having a nonporous layer of a perfluorinated polymer or copolymer are remarkably well suited to dehydrate mixtures of water and methanol with other components. These membranes have a very high permeance of water and methanol. For example, the high permeance of water is about $10 \times 10^{-4}$ kmol/m$^2$-hr-mm Hg. This high permeance exists over a wide range of concentrations of water and methanol in the mixture to be separated. The permeance remains very constant over the wide range of water and methanol concentration. The permeance is notably high at concentrations of water and methanol below 10 wt. % water or methanol in the mixture.

Perfluorinated polymer or copolymer membranes also provides remarkably good chemical inertness and chemical resistance of the material. The membrane material is thus unlikely to be affected by or to affect the components of the reaction mass of a chemical reaction for which it is being employed to remove the byproduct.

The selective layer polymer should be perfluorinated. The terms "perfluorinated polymer" and "perfluoropolymer" and cognates thereof are used interchangeably herein and are meant to identify a polymeric compound in which all of the substituent positions of carbon in the polymer molecule are fluorine. This provides remarkably good chemical inertness and chemical resistance of the material. Some preferred catergories of polymers suitable for use in this invention include, but are not limited to: (i) polymers comprising a perfluorinated dioxole monomer; (ii) polymers comprising a perfluorinated dioxolane monomer; (iii) polymers comprising a perfluorinated alkyl ether monomer; (iv) perfluorinated polyimides; and (v) polymers incorporating tetrafluoroethylene units.

The polymers and copolymers of the selectively permeable membrane can be characterized by a glass transition temperature ("$T_g$"). The glass transition temperature of a polymer is a phase transition temperature at which the polymer changes from a brittle, vitreous or glassy state to a rubbery or plastic state. Since the polymers used for the selective layer should preferably remain rigid and glassy during operation, they should also have glass transition temperatures comfortably above temperatures to which they are typically exposed during the process. Polymers with glass transition temperature preferably at least about 40° C., more preferably at least about 60° C., still more preferably at least about 100° C. and most preferably at least about 140° C. such as amorphous perfluoropolymers and copolymers are desirable for use in this invention.

None of these are new polymers in themselves. In fact, general polymer formulations embracing those suitable for use in the invention are described in patents dating back from the present day to the 1960s, for example, U.S. Pat. Nos. 3,308,107; 3,488,335; 3,865,845; 4,399,264; 4,431,786; 4,565,855; 4,594,399; 4,754,009; 4,897,457; 4,910,276; 5,021,602; 5,117,272; 5,268,411; 5,498,682; 5,510,406; 5,710,345; 5,883,177; 5,962,612; and 6,040,419.

Preferably the polymer is an amorphous perfluoropolymer. Homopolymers of tetrafluoroethylene are very chemically inert and, thus, resistant to plasticization. However, at temperatures of interest for membrane gas separations, they tend to be crystalline or semi-crystalline. As a result, the gas permeabilities through the polymer in non-porous form are too low to be of interest for use for the selective layer of a gas-separation membrane. Incorporated into copolymers, however, they enhance chemical resistance. Therefore, combinations of tetrafluoroethylene with other monomer units that result in overall amorphous, yet rigid, perfluorinated, copolymers are particularly preferred.

An example of members of the polymer groups cited above that are suitable for practice of the invention, are certain of the dioxole polymers and copolymers of perfluoro-2,2-dimethyl-1,3-dioxole ("PDD") reported in U.S. Pat. No. 5,051,114. These polymers are characterized by very high fractional free volume within the polymer, typically above 0.3. Likewise, these polymers are of low density compared with other crystalline fluoropolymers, such as below about 1.8 g/cm$^3$ and are unusually gas permeable, for instance, exhibiting pure gas permeabilities as high as 1,000 Barrers or more for oxygen and as high as 2,000 Barrers or more for hydrogen.

In some preferred embodiments, the copolymer is copolymerized PDD and at least one monomer selected from the group consisting of tetrafluoroethylene ("TFE"), perfluoromethyl vinyl ether, and vinylidene fluoride. In other preferred embodiments, the copolymer is a dipolymer of PDD and a complementary amount of TFE, especially such a polymer containing 50-95 mole % of PDD. Examples of dipolymers are described in further detail in U.S. Pat. No. 4,754,009 of E. N. Squire, which issued on Jun. 28, 1988; and U.S. Pat. No. 4,530,569 of E. N. Squire, which issued on Jul. 23, 1985. Perfluorinated dioxole monomers are disclosed in U.S. Pat. No. 4,565,855 of B. C. Anderson, D. C. England and P. R. Resnick, which issued Jan. 21, 1986. The disclosures of all U.S. patent documents disclosed in this application are hereby incorporated herein by reference.

With respect to amorphous copolymers of PDD, the glass transition temperature will depend on the composition of the specific copolymer of the membrane, especially the amount of TFE or other comonomer that may be present. Examples of $T_g$ are shown in FIG. 1 of the aforementioned U.S. Pat. No. 4,754,009 of E.N. Squire as ranging from about 260° C. for dipolymers with 15% tetrafluoroethylene comonomer down to less than 100° C. for the dipolymers containing at least 60 mole % tetrafluoroethylene. It can be readily appreciated that perfluoro-2,2-dimethyl-1,3-dioxole copolymers according to this invention can be tailored to provide sufficiently high $T_g$ that a membrane of such composition can withstand exposure to steam temperatures. Hence, membranes of this invention can be made steam sterilizable and thereby suitable for various uses requiring sterile materials, especially those involving biological materials, for example pharmaceutical chemicals and materials comprising living cells.

Also importantly for improving dehydration via vapor permeation, membranes of PDD copolymers can function at very high temperatures. The glass transition temperature and thus the softening point of PDD/TFE copolymers depends considerably upon the proportion of TFE comonomer units. Readily available compositions provide glass transition temperatures sufficiently high that the novel membrane process can be operated in the range from about 25° C. to about 200° C. or more. At such temperatures the pressure on the feed side of the membrane can be maintained very high without condensing the feed mixture. Accordingly, the pressure differential across the membrane can be maximized to promote transmembrane flux greater than would be possible had the membrane not been able to stand up to such high temperatures. Preferably, the glass transition temperature of the amorphous PDD copolymer should be at least 115° C.

Other polymers which are suitable for use in accord with this invention are copolymer of TFE and 2,2,4-trifluoro-5-trifluoromethoxy-1,3-dioxole (Hyflon®, Solvay Solexis, Thorofare, N.J.), and polyperfluoro (alkenyl vinyl ether) (Cytop®, Asahi Glass, Japan).

Preferably the active layer, i.e., the selectively permeable portion, of the membrane should be non-porous. In preferred embodiments, the membrane structure comprises an active layer coated on a microporous substrate. The substrate material may, but need not, exhibit low surface energy. The substrate can be any microporous material that allows passage of the permeate. By "microporous" is meant that the structure has pores throughout which form continuous interstices or passageways extending from one side of the substrate through the thickness to the other side. Many conventional, readily available and thus generally inexpensive, microporous membrane substrate materials can be used provided that they are sufficiently compatible with the low surface energy material to accept a coating of the latter. Care should be exercised to assure that the substrate material is chemically compatible with all of the components with which it comes in contact. That is, the substrate should be able to maintain its structural integrity without significant decomposition or deterioration despite enduring contact with these components.

Generally organic or inorganic polymers mixed with organics can be used to prepare the microporous substrate material. Representative organic polymers suitable for the microporous substrates according to the invention include polysulfone; polyethersulfone; polycarbonate; cellulosic polymers, such as regenerated cellulose polymer, cellulose diacetate polymer, cellulose triacetate polymer, cellulose nitrate polymer, and blends of these; polyamide; polyimide; polyetherimide; polyurethane; polyester; polyacrylate and polyalkyl methacrylate, such as polymethyl methacrylate; polyolefin, such as polyethylene and polypropylene; saturated and unsaturated polyvinyls, such as polyvinyl chloride, polyvinyl fluoride, polyvinylidene chloride, polyvinylidene fluoride; polyvinyl alcohol, fluorine substituted polymer such as polytetrafluoroethylene and poly(tetrafluoroethylene-perfluoropropylvinylether); polyetheretherketone; polyacrylonitrile and polyphosphazine. Representative inorganic substrate compositions include zirconia, alumina, titanium dioxide, and BaTiO.sub.3 based microporous media and the like.

Methods of forming membranes having a thin active layer coated on microporous substrate are well known as for example disclosed in U.S. Pat. No. 6,221,247 titled "Dioxole coated membrane module for ultrafiltration or microfiltration of aqueous suspensions" of Nemser et al., U.S. Pat. No. 5,914,154 titled "Non-porous gas permeable membrane" of Nemser, and the aforesaid U.S. Pat. No. 5,051,114 titled "Perfluorodioxole membranes" of Nemser et al.

The microporous membrane structure would likely be installed in a module for convenient operation of the dehydration process. The novel water and methanol removal methods can be used with any of the well known module configurations, such as flat sheet, hollow fiber, tubular, spiral wound and vortex devices (also known as "rotating" devices). Other useful configurations include pleated sheet and tube ribbon form. Membrane tubes and tube ribbons are disclosed in U.S. Pat. No. 5,565,166.

Preferably the membrane structure takes the form of a hollow fiber of support material having a thin coating of the active layer one the inner, and/or outer fiber surfaces. Hollow fiber membranes and modules comprising hollow fiber membranes are well known as disclosed by U.S. Pat. Nos. 3,499,062 and 3,536,611, for example.

Because the perfluoropolymer selective membrane utilized in this invention exhibits permeability of water and methanol that is remarkably high and uniform permeability through over a broad range of compositions of mixtures with product components, separations are very productive and practical in which the concentration of the water or methanol in the feed composition can be up to about 99 wt. %. In many utilities the feed composition can contain as little as about 1 wt. % of water and/or methanol and in certain preferred embodiments the initial concentration of water and/or methanol can be below 1 wt. % and as low as about 30 ppm.

In an important aspect this invention provides a significantly effective technique for carrying out certain reversible chemical reactions to achieve high conversion of reactants to useful and desired reaction products. For reversible reactions typified by the following equation (I):

$$A+B \leftrightarrow R+S \qquad (I)$$

in which A and B are reactant species and R and S are product species, the equation for the rate of formation of the products from reactants, r, is determined by the following equation (II):

in which $k_1$ and $k_2$ are constants and $C_A, C_B, C_R$ and $C_S$ are the concentrations in the reaction mass of components A, B, R and S, respectively. As the concentrations of products build up, the reverse reaction rate quantity $k_2 C_R C_s$ increases and the overall rate of reaction, r, reduces. Reaction (I) can be driven farther toward an equilibrium state that favors formation of products by lowering the concentrations of the products in the reaction mass. This is accomplished by removing one or more of the products.

In many reversible reaction systems water or methanol is a byproduct. Thus by removing water or methanol from the reaction mass as the case may be, equilibrium can be driven toward product formation and the rate of producing desired product species is increased. According to the present invention, byproduct is removed by contacting a side of a selectively permeable membrane having an active layer of amorphous perfluoropolymer with the reaction mass under conditions which favor the transmission of the byproduct through the membrane. Where the reaction mass is in the gaseous state this membrane removal can be achieved by vapor permeation. Where the reaction mass is in the liquid state, membrane removal occurs by pervaporation.

Some broad categories of reversible reactions in which the novel removal of water or methanol by pervaporation or vapor permeation using a perfluoropolymer active layer selective membrane are listed in the following table 1.

TABLE 1

| Reactant A | Reactant B | Product | Examples of Product |
|---|---|---|---|
| Acid | Alcohol | Ester | $C_6H_5C=OOC_2H_5$ |
| Ketone | Alcohol | Ketal | $CH_3CH_2CH(OC_2H_5)_2$ |
| Aldehyde | Amine | Imine | $CH_3CH=NCH_3$ |
| Ketone | Amine | Imine | $(CH_3)_2C=NCH_3$ |

Removing byproduct from reaction masses of reactions such as those exemplified in Table 1 is generally much more energy efficient in the novel membrane separation process than conventional separation processes. The energy for such membrane separations is utilized to vaporize the water or methanol permeating through the membrane and to produce a driving force for permeation across the membrane. A pressure gradient driving force can be obtained by pressurizing the mass on the feed side of the membrane and/or by drawing a vacuum on the permeate side. The novel removal technique can be retrofitted into existing unit operations without significant additional modification. Not uncommonly, the reaction mass in reversible reaction systems is pressurized and therefore, the need to compress the feed to the membrane can be negligible.

In addition to energy savings, the novel membrane technique for water/methanol removal advantageously obviates the drawbacks of traditional removal methods. Azeotropic distillation is a conventional dehydration technique. The reaction mass is mixed with an entrainer compound that forms an azeotropic composition with water. The azeotropic composition is removed from the reaction mass, typically by distillation allowing the reaction to proceed toward greater conversion of reactants. The azeotrope is then processed to recover the entrainer compound. Operation of the azeotropic distillation unit operation is energy intensive and is also inconvenient due to the need to handle large volumes of materials not directly involved in the synthesis process, namely, the entrainer. The novel membrane water separation eliminates the need to treat and dispose of waste entrainers.

Membrane separation according to this invention also presents advantages over molecular sieve water removal that is customarily used in many reversible reaction product synthesis systems. In the molecular sieve technique fine particles of molecular sieve material are dispersed in the reaction mass. The sieve particles adsorb water and then are removed from the reaction mass. Physical separation of the wet sieve particles and desorbing the water to regenerate them makes molecular sieve water removal inconvenient and unproductive.

In another particularly preferred embodiment of this invention a pervaporation separation employing a perfluoropolymer selectively permeable membrane can be used to remove excess water present during enzyme catalyzed reactions in non-aqueous media. Although presence of some water can raise enzyme activity in certain systems, increased water concentrations can be detrimental to enzyme activity. Water is known to adversely cause enzyme agglomeration and decrease of enzyme stability when water is also a byproduct of enzyme-catalyzed reactions in organic media. When water is a byproduct its presence in large amount can also unfavorably shift equilibrium away from formation of products as mentioned above. Therefore it is often desirable to control the concentration of water to an optimized range in non-aqueous enzyme catalyzed reactions.

Removal of excess water can be achieved by contacting the enzyme catalyzed reaction mass with the perfluoropolymer membrane under pervaporation conditions. Due to their high fluorine content, these membranes are generally very resistant to degradation by organic solvents that are frequently used in enzyme catalyzed reactions as well as having high permeability to water. An example of an enzyme catalyzed reaction in non-aqueous medium to which this invention can be well applied is the lipase catalyzed esterification of caprylic acid and n-butanol that is carried out in cyclohexane as described in *Enzymatic esterification reaction in organic media with continuous water stripping; effect of water content on reactor performance and enzyme agglomeration*, J. C. Jeong and S. B. Lee, Biotechnology Techniques Vol. 11, No. 12, Chapman and Hall, 1997, pp. 853-858.

Removing water from an enzyme catalyzed reaction mass using a perfluorinated polymer or copolymer selectively permeable membrane can drive an equilibrium reaction very effectively farther to completion then would occur without water removal. In addition, separating water from the enzyme catalyzed reaction mass using a perfluorinated polymer or copolymer membrane can cause the initial conversion of reactants to products occur at a higher rate. By initial conversion is meant the conversion of reactants at typically lower extents of conversion, preferably less than about 80% conversion, and more preferably less than about 60% conversion, that exist at the start of reaction when low concentrations of byproduct are present.

Figure 2:
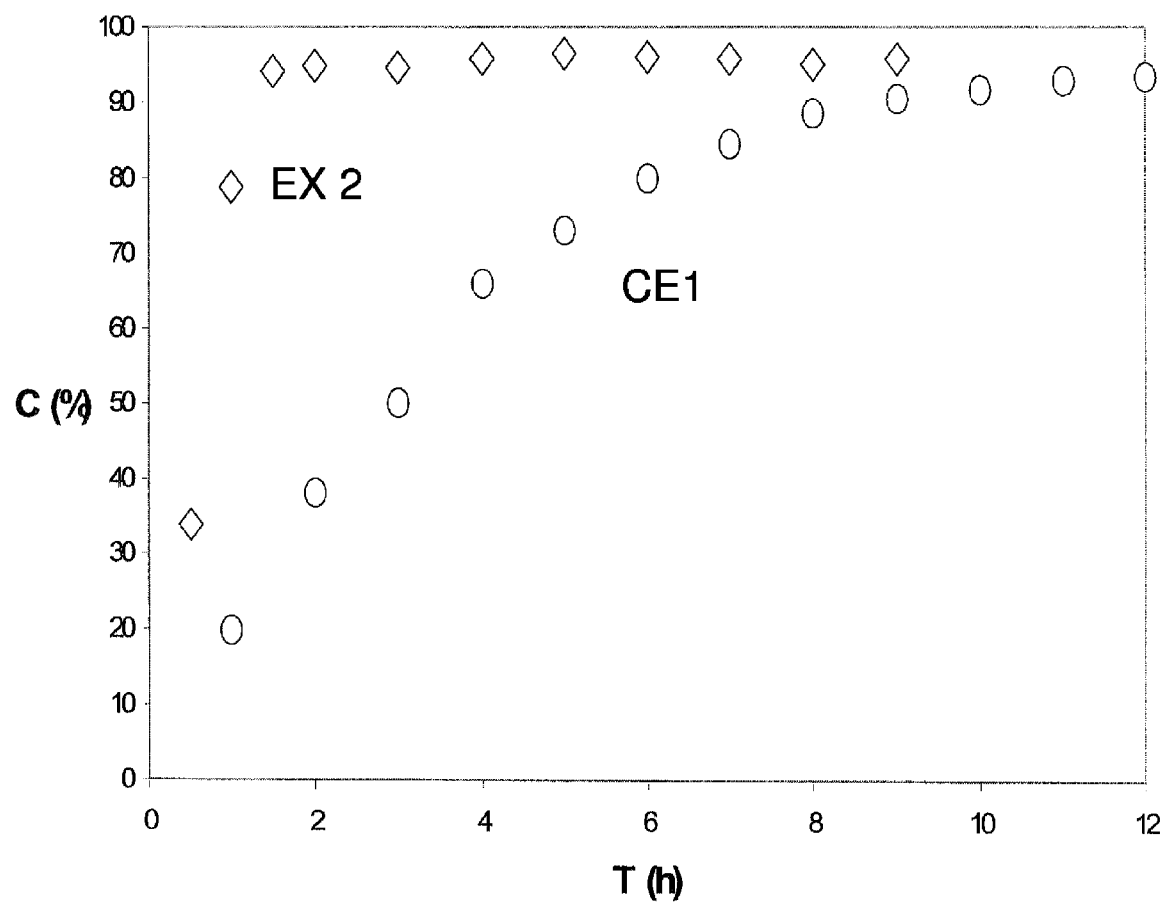
FIG. 2 is a plot of percent conversion of geraniol to geranyl acetate as a function of reaction time in hours of geraniol in accord with a examples disclosed herein below.
Figure 3:
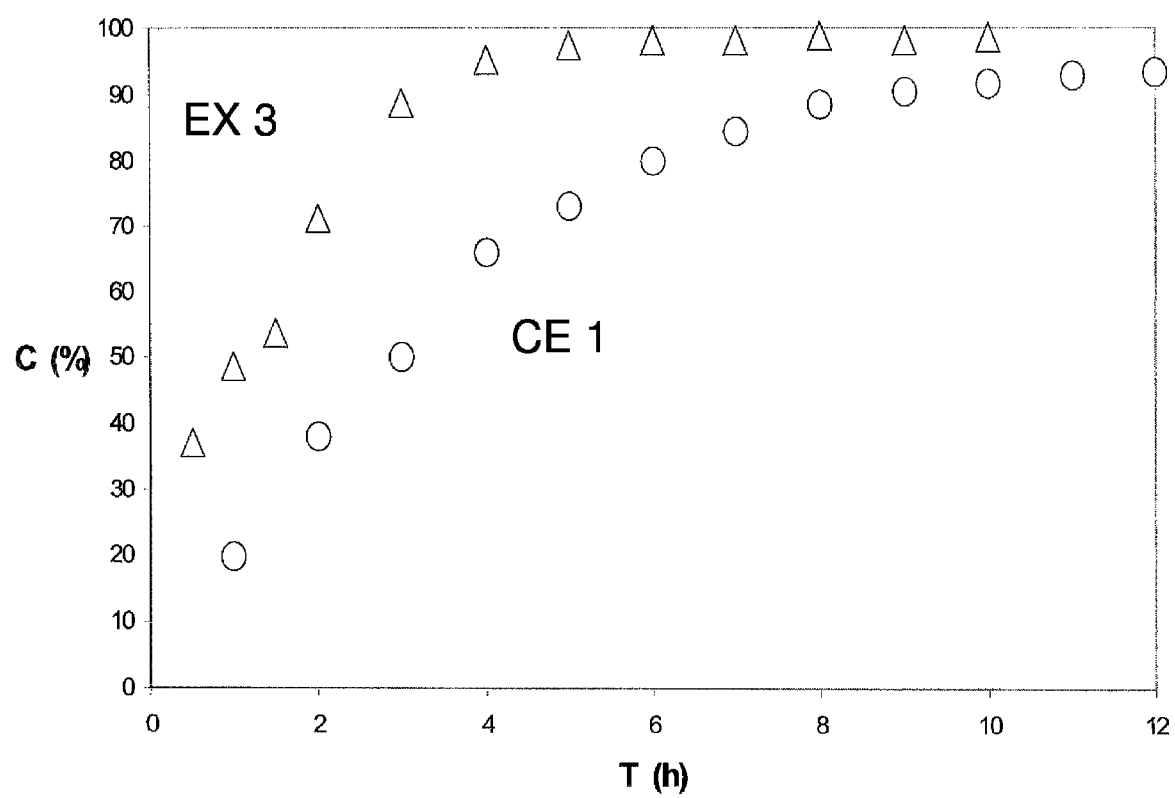
FIG. 3 is a plot of percent conversion of geraniol to geranyl acetate as a function of reaction time in hours of geraniol in accord with examples disclosed herein below.

This large increase in rate of conversion can be explained with reference to FIGS. 2 and 3. These plots show the results of Examples 2 and 3, and Comparative Example 1 which are more completely described below. For present discussion, the drawings are plots of conversion versus time of reaction. In Comp. Ex 1, (results labeled "CE1" in the drawings) an enzyme catalyzed equilibrium reaction was carried out without water removal from the reaction mass. In operative Example 2 (labeled "EX 2"), the same reaction was carried out but water was continuously removed from the reaction mass by selective permeation through a perfluoropolymer membrane. Water was also continuously removed in Example 3 ("EX 3") while the reactant ratio was also changed. In both charts at initial conversions the slopes of the trace of data points for the operative examples were steeper than those of CE1. That is, the rate of converting reactants to product was higher with water removal than without. The increased rate of conversion obtained by water removal using a perfluoropolymer membrane is unexpected because effective water removal in this situation with hydrophobic selectively permeable membrane material such as perfluorinated polymer and copolymer membranes is counterintuitive.

In context of the separation of byproduct from reversible reactions the above discussions has concentrated upon disclosure of water as the byproduct being removed. The novel process which uses preferably nonporous active layers of amorphous perfluoropolymer for the pervaporation and vapor permeation membrane can also be used to separate methanol by product from higher alcohol-containing reaction masses.

EXAMPLES

Comparative Example 1

Enzyme Catalyzed Formation of Geranyl Acetate without Byproduct Water Removal Into a cleaned 500 ml round bottom glass flask were placed catalyst, n-hexane solvent and reactants totalling 220 mL reaction volume to produce geranyl acetate by reaction of geraniol with acetic acid. The catalyst was Novozyme® 435 enzyme (Novozymes A.S., Denmark), a non-specific thermostable lipase from *Candida Antartica* classified as a tryacylglycerol hydrolase (E.C. 3.1.1.3). The enzyme was immobilized on spherical, macroporous, acrylic resin particles with a diameter in the range of 0.3 to 0.9 mm (bulk density: 430 kg/m$^3$ and water content <3% w/w). It was stored at 4° C. until used. Geraniol (98%) and glacial acetic acid (>99.7%) were present at stoichiometric ratio at 0.1 molar concentration. Concentration of enzyme in the reaction mass was 10 wt. %. The materials were charged to the flask in the sequence of catalyst, geraniol, solvent and acetic acid. The reaction was carried out at 30° C. using a heating mantle with an agitator stirring the mass at 200 rev. per min. A reflux condenser was used to return vapor to the reaction mass.

The reaction continued for approximately 12 h with 1 mL samples taken periodically. Of the samples 1 µL aliquots were quantitatively analyzed chromatographically. A model 3800 (Varian, Inc.) chromatograph with flame ionization detector, and 30 m long 0.25 mm inner diameter DB-WAX capillary column was used with a 30° C. per min. ramp from 56-200° C. was used. At these conditions acetic acid, geranyl acetate and geraniol had retention times of 13.4 min., 15.4 min. and 15.7 min, respectively. Conversion values were calculated on the basis of geraniol present in the sample relative to the initial geraniol amount. Conversion values are plotted as a function of duration of reaction and labeled "CE1" in FIGS. 12 and 13. Conversion rose monotonically as the reaction proceeded and asymptotically approached an equilibrium value of 94%.

Example 2

Enzyme Catalyzed Formation of Geranyl Acetate with Byproduct Water Removal Using a Flat Membrane The chemical reaction as described in Comp. Ex. 1 was repeated with the reactor flask 121 connected to the testing apparatus schematically illustrated in FIG. 1 such that the reaction mass continously recirculated in contact with a perfluoropolymer membrane. The heating mantle is represented by element 122. The agitator and reflux condenser are not shown. The reaction mass 126 was pumped to a membrane holder 129 by pump 123 via ⅛ inch diameter tubing 128. The membrane holder contained a flat membrane 130 consisting of a layer of copolymer of 65 mol % perfluoro-2,2-dimethyl-1,3-dioxole and 35 mol % tetrafluoroethylene ("TAF-1600") on a porous substrate of expanded polytetrafluoroethylene ("e-PTFE"). The membrane was a 47 mm diameter circular sheet having 13.8 cm$^2$ effective area for permeation and was in the range of 3-6 µm thick. Prior to carrying out the experiment, the membrane was subjected to pure nitrogen, oxygen and helium gas permeation tests which measured oxygen/nitrogen and helium/nitrogen selectivities close to the ideal values and thereby confirmed that the TAF-1600 layer was nonporous. A filter element was deployed in the pump suction line to prevent fouling the recirculation system by the catalyst particles. After contacting the membrane, the liquid reaction mass recirculated to flask 121 via tubing 131.

Suction of less than 250 mTorr was drawn on the permeate side of membrane 130 by vacuum pump 133 and tubing 137 to create a driving force for pervaporation of reaction mass components through the membrane. Cold trap 132 was used to capture permeate for mass balance purposes. A flow of nitrogen gas 134 was swept across the permeate side of the membrane to reduce the partial pressure of water in the permeate composition and thereby increase transmembrane flux. As a consequence of pervaporation, water preferentially permeated the membrane and was thereby removed from reaction mass while being produced by the esterification.

The reaction continued for about 9 hours during which samples were taken and analyzed as in Comp. Ex. 1. Conversion of the geraniol was determined and is plotted as a function of reaction duration as points labeled "EX. 2" in FIG. 2. The data of this figure demonstrate that equilibrium conversion of 96% was higher than was attained in Comp. Ex. 1 (94%) in which water byproduct was not removed. Equilibrium conversion was reached in about three hours compared to about 8.5 hours for Comp. Ex. 1. The rate of reaction of the initial stage of the reaction (i.e., at lower conversions) was increased by about 200% relative to the rate of the comparative example.

Example 3

Enzyme Catalyzed Formation of Geranyl Acetate with Byproduct Water Removal Using a Hollow Fiber Membrane Module For Example 3 the procedure of Ex. 2 was repeated except that a hollow fiber membrane module of the general type as element 95 (FIG. 9) was substituted for the membrane holder and the flat membrane. The hollow fiber module contained 15 microporous polysulfone fibers of 30.5 cm active length, 305 µm inner diameter and 488 µm outer diameter which provided an effective surface area for permeation of 70 cm$^2$. The inside surface of the fibers was coated with a layer of TAF-1600 copolymer of about the same thickness as in Ex. 2. In addition to substituting a hollow fiber membrane module for the flat sheet membrane, the molar ratio of acetic acid/geraniol was increased from 1 to 2. Results are plotted as points Ex. 3 in FIG. 13. These data show that the equilibrium conversion achieved is 98% which is significantly higher than 94% maximum conversion attained in Comp. Ex. 1. Reaction rate of the first stage of reaction was increased by 180% of that for Comp. Ex. 1.

Example 4

Enzyme Catalyzed Formation of Geranyl Acetate with Byproduct Water Removal Using a Hollow Fiber Membrane Module For Example 4 the procedure of Ex. 3 was repeated except that the molar ratio of acetic acid/geraniol was maintained at 1 to 1 as in Ex. 2 and Comp. Ex. 1. The conversion reached equilibrium conversion after 4 hours and rate of reaction during the first stage (i.e. at lower conversions) increased by 180% relative to the comparative example. FIGS. 2 and 3 show that about 8.5 hours were needed for Comp. Ex. 1 to attain equilibrium conversion.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A method of conducting a chemical reaction to make a reaction product and a byproduct comprising the steps of
   (A) providing reactants for a reversible, enzyme catalyzed, chemical reaction in which the byproduct is selected from the group consisting of water, methanol and a mixture thereof,
   (B) providing an enzyme catalyst for the chemical reaction,
   (C) reacting the reactants in the presence of the enzyme catalyst to form a reaction mass comprising the reaction product, the byproduct and residual reactants,
   (D) contacting a membrane comprising a selectively permeable layer comprising a perfluoropolymer with the reaction mass,
   (E) applying a driving force across the membrane effective to selectively permeate the byproduct and to retain a reaction mass depleted of the byproduct relative to the reaction mass of step (C),
   (F) continuing the chemical reaction of the reaction mass depleted of the byproduct,
   (G) collecting reaction mass, and
   (H) optionally, adding reactants to the reaction mass of step (G) and repeating steps (C)-(G); and wherein the chemical reaction is selected from among the group consisting of
   (i) synthesis of esters by reaction of an organic acid with an alcohol,
   (ii) synthesis of ethers by reaction of an aldehyde with an, alcohol,
   (iii) synthesis of ketals by reaction of a ketone with an alcohol,
   (iv) synthesis of imines by reaction of an amine with an aldehyde or ketone,
   (v) transesterification which produces methanol as a byproduct, and
   (vi) synthesis of sugar ester by esterification of alcohol sugar.

2. The method of claim 1 in which the rate of conversion of reactants to the reaction product at conversion below 80% is faster than occurs for the rate of conversion of reactants to the reaction product without steps (D)-(F) and (H).

* * * * *